United States Patent
Krishna et al.

(10) Patent No.: US 9,881,011 B2
(45) Date of Patent: Jan. 30, 2018

(54) SYSTEM AND METHOD FOR GENERATING USER PROFILES FOR HUMAN RESOURCES

(71) Applicant: Ricoh Co., Ltd., Tokyo (JP)

(72) Inventors: Vikas Krishna, San Jose, CA (US); Timothee Bailloeul, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 323 days.

(21) Appl. No.: 13/689,746

(22) Filed: Nov. 29, 2012

(65) Prior Publication Data

US 2014/0149384 A1 May 29, 2014

(51) Int. Cl.
*G06F 7/00* (2006.01)
*G06F 17/30* (2006.01)

(52) U.S. Cl.
CPC .............................. *G06F 17/30035* (2013.01)

(58) Field of Classification Search
USPC ........................................................ 707/711
See application file for complete search history.

(56) References Cited

U.S. PATENT DOCUMENTS

| | | | |
|---|---|---|---|
| 6,874,002 B1 * | 3/2005 | Peleus et al. ................. | 707/812 |
| 7,437,309 B2 | 10/2008 | Magrino et al. | |
| 7,519,539 B1 | 4/2009 | Fliess et al. | |
| 8,335,496 B1 * | 12/2012 | Bort ........................... | 455/414.4 |
| 2005/0222899 A1 | 10/2005 | Varadarajan et al. | |
| 2005/0267817 A1 * | 12/2005 | Barton et al. .................. | 705/26 |
| 2007/0150466 A1 * | 6/2007 | Brave et al. ..................... | 707/5 |
| 2009/0263777 A1 * | 10/2009 | Kohn ............................ | 434/350 |
| 2011/0238591 A1 | 9/2011 | Kerr et al. | |
| 2012/0159403 A1 * | 6/2012 | Capan ............... | G06F 17/30017 715/863 |
| 2013/0080242 A1 * | 3/2013 | Alhadeff ............ | G06Q 30/0217 705/14.39 |

* cited by examiner

*Primary Examiner* — Muluemebet Gurmu

(74) *Attorney, Agent, or Firm* — Patent Law Works LLP

(57) ABSTRACT

A system and method for generating user profiles for human resources are described. The system includes an enterprise service bus configured to receive a request to transmit media to a device and route the media to a device and network appliance as a service (NAaaS) application services configured to receive the request from the enterprise services bus, generate a user profile for a user, log a device usage entry that includes a unique identifier for the user, a unique identifier for the device and an action associated with the request, determine one or more keywords relating to content in the media, generate an index that includes the one or more keywords and update the user profile for the user based on the one or more keywords.

17 Claims, 9 Drawing Sheets

SYSTEM AND METHOD FOR GENERATING USER PROFILES FOR HUMAN RESOURCES

BACKGROUND OF THE INVENTION

1. Field of the Invention

The specification relates to a system and method for generating user profiles for human resources. In particular, the specification relates to generating an index of media and using the index to generate user profiles for human resources.

2. Description of the Background Art

Human resource systems contain information on employee skills. These are often created at the time of hiring based on an employee's resume. The employee skills are rarely updated as employees learn new skills and take on new job roles, rendering human resource systems information stale. As a result, users receive inaccurate results when searching for an employee with a certain skillset.

To alleviate this problem, employees are sometimes incentivized to update their skills and roles information. Because this is done manually, employees often ignore the request and let their list of skills languish.

In other circumstances, employee profiles can be automatically updated by project management-related information. In such a scenario, a project management tool is used to monitor the progress of a project. Whenever an event is completed, it is directly cascaded into the human resources systems information. However, these systems have poor semantic content that fail to describe the set of skills acquired by the employee.

SUMMARY OF THE INVENTION

The invention overcomes the deficiencies of the prior art with a system for generating user profiles for human resources. In one embodiment, the system includes one or more processors, an enterprise service bus executable by the one or more processors, the enterprise service bus configured to receive a request to transmit media to a device and route the media to a device and a network appliance as a service (NAaaS) application services executable by the one or more processors, the NAaaS application services configured to receive the request from the enterprise service bus, generate a user profile for a user, log a device usage entry that includes a unique identifier for the user, a unique identifier for the device and an action associated with the request, determine one or more keywords relating to content in the media, generate an index that includes the one or more keywords and update the user profile for the user based on the one or more keywords. In some embodiments, the NAaaS application services are further configured to receive a search query from the enterprise service bus that originated with a requestor, identifies one or more keywords that match a term in the search query, identify media corresponding to the one or more keywords, identify the user profile for the user associated with the media and transmit one or more of the user profile and the media to the enterprise service bus, for transmission to the requestor.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes, and not to limit the scope of the subject matter disclosed herein.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1A:
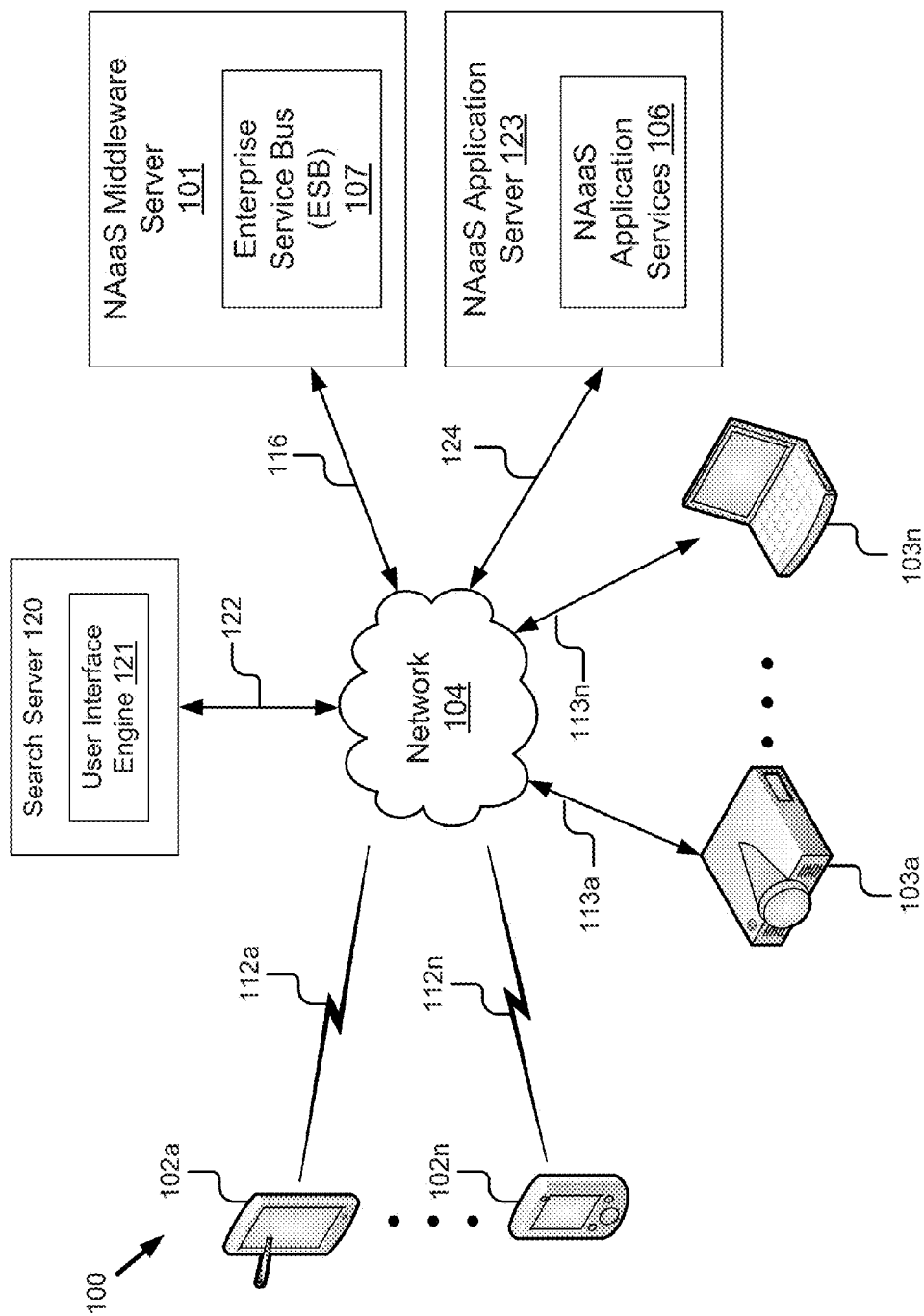
FIG. 1A is a high-level block diagram illustrating one embodiment of a system for generating user profiles.

A system and method for generating user profiles for human resources are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1A illustrates a high-level block diagram of a system 100 for generating user profiles for human resources according to one embodiment. The illustrated embodiment of the system 100 comprises: user devices 102a-102n, collaborative computing devices 103a-103n, a network 104, a search server 120, a Network Appliance As AService (NAaaS) middleware server 101 and a NAaaS application server 123. In FIG. 1A and the remaining figures, a letter after a reference number, for example, "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of user devices 102a-102n, the plurality of collaborative computing devices 103a-103n, the search server 120, the NAaaS application server 123 and the NAaaS middleware server 101, in practice any number of networks 104 can be connected to the entities.

The user devices 102a-102n are devices associated with a particular user. For example, a company provides its employees with a mobile device or a laptop. The user devices 102a-102n are each coupled to the network 104 via signal lines 112a-112n respectively. The user device 102 is any computing device including a memory, a processor and a communication capability. For example, the user device 102 can be a tablet computer, a personal digital assistant, a smart phone, a feature phone, etc. The user devices 102 can communicate with the network 104 wirelessly or through wired connectivity. The user devices 102 include one or more user applications (not shown) that generate messages to be processed by the enterprise service bus 107.

The user device 102 is adapted for sending and receiving data to and from the NAaaS middleware server 101. For example, the user device 102 sends a command to project an image of a presentation program document on at least one of the plurality of collaborative computing devices 103a-103n to the NAaaS middleware server 101. The user device 102 includes a display for viewing information provided by the enterprise service bus 107. For example, the user device 102 receives graphical data from the NAaaS middleware server 101 for listing the plurality of collaborative computing devices 103a-103n for display on the user device 102.

The user device 102 determines its location so that the user device 102 can interact with other user devices 102 or collaborative computing devices 103 via the NAaaS middleware server 101. The user device 102 determines its location information by using global positioning system (GPS) circuitry included within the device itself to determine its location. For determining the user device's 102 location indoors, the user device 102 employs radio frequency, ultra-sound signal or invisible light communication. For example, the user device 102 determines its location through wireless access points based on measuring the intensity of received signals. The user device 102 accesses a database including pairs of media access control (MAC) addresses and locations over the Internet. To determine a location, the user device 102 retrieves the location corresponding to the access point MAC address from the database.

In another embodiment, the user device 102 performs a device discovery process that works via the network 104 using specific protocols like SNMP, ICMP, Bonjour, etc. For example, the user device 102 queries the NAaaS middleware server 101 to discover devices. The NAaaS middleware server 101 uses SNMP or ICMP protocols to discover devices and reports back to the user device 102 with the found devices together with their internet protocol (IP) address, media access control (MAC) addresses, etc.

The collaborative computing devices 103a-103n are devices associated with a particular location and/or a particular function. Collaborative computing devices 103a-103n can be assigned to a conference room or are assigned for meetings. For example, a projector and an interactive whiteboard can be assigned to a select conference room from a plurality of conference rooms inside a building. The collaborative computing devices 103a-103n are each coupled to the network 104 via signal lines 113a-113n respectively. The collaborative computing device 103 is any computing device including a memory and a processor. For example, the collaborative computing device 103 can be a projector, a monitor, a television, an interactive whiteboard, a webcam, a microphone, a loudspeaker, a CD/DVD player, an electronic paper device, an electronic reader, a desktop computer, a tablet, a smartphone, etc.

The collaborative computing device 103 is adapted for sending and receiving data to and from the NAaaS middleware server 101. For example, a projector in a conference room can receive a presentation program document from the NAaaS middleware server 101. In another example, a video conferencing device including a webcam, a microphone and a monitor in a first location can capture a real-time audio-video synchronous communication data stream and send it to another video conferencing device in a second location through the enterprise service bus 107 in the NAaaS middleware server 101.

The NAaaS middleware server 101 is any computing device including a memory and a processor which is connected to the network 104 via signal line 116. The NAaaS middleware server 101 comprises an enterprise service bus 107. The enterprise service bus is described in further detail below with reference to FIG. 2A.

The enterprise service bus 107 includes code and routines for providing a standard interface to one or more networks of disparate devices and their corresponding server clouds that are deployed independently to communicate with each other. In one embodiment, the enterprise service bus 107 executes one or more services including invocation support, routing (e.g., content based routing, static/deterministic routing, policy based routing, rules based routing) mediation, message queue (e.g., publish-subscribe), process choreography, service orchestration, complex event processing, security and management (e.g., monitoring, logging). The enterprise service bus 107 also calls methods contained in the code on the NAaaS application services 106 that implement the services. For example, the enterprise service bus 107 instructs the NAaaS application services to authenticate users, log device usage entries, store media, analyze media, index keywords related to users' skills and search a database for user profiles that include skills that match a user query.

The user devices 102a-102n or the collaborative computing devices 103a-103n use a particular messaging format over a particular communication protocol to communicate with and send service requests to each other through the enterprise service bus 107. A message format defines the structure and form of the message. For example, message formats include eXtensible Markup Language (XML), JavaScript Object Notation (JSON), etc. A communication protocol defines a set of rules governing the syntax, semantics, and synchronization of communications. For example, communication protocols include File Transfer Protocol (FTP), Hypertext Transfer Protocol (HTTP), Message Queue (MQ), Internet Inter-Orb Protocol (IIOP), Simple Object Access Protocol (SOAP), etc. While the enterprise service bus 107 and the NAaaS application services 106 are illustrated as being on separate servers, in one embodiment they are on the same server.

The NAaaS application server 123 is any computing device including a memory and a processor which is connected to the network 104 via signal line 124. The NAaaS application server 123 includes NAaaS application services 106, which is a collection of implementation services that are abstracted as an application and composed by the enterprise service bus 107 in order to deliver higher level services. The NAaaS application services 106 are described in further detail below with reference to FIG. 2B.

The search server 120 is any computing device including a memory and a processor that is connected to the network 104 via signal line 122. The search server 120 comprises a user interface engine 121. While the search server 120 is illustrated in FIG. 1A as being a separate server, in some embodiments the user interface engine 121 could be stored on a user device 102 or function as a standalone application.

The user interface engine 121 is software and routines for generating graphical data for displaying a user interface. In one embodiment, the user interface engine 121 is a set of instructions executable by the processor to provide the functionality described below for generating graphical data for displaying a user interface. In another embodiment, the user interface engine 121 is stored in the memory and is accessible and executable by the processor.

The user interface engine 121 receives a request for generating graphical data for displaying a search user interface. For example, the user interface engine 121 generates graphical data for displaying a webpage with a text box for inputting a query. The user inputs the query and the user interface engine 121 transmits the query to the enterprise service bus 107, which transmits the request to the NAaaS application services 106. The search user interface may include an input for entering a search query by a requestor. The search query may include text information, visual information or audio information.

The NAaaS application services 106 retrieve matching search results and send the search results to the enterprise service bus 107, which transmits the search results to the user device 102. In one embodiment, the user interface engine 121 transmits one or more of the profile and the media to the requestor via the enterprise service bus 107. An example of the search user interface is described below in more detail with reference to FIG. 3.

Figure 1B:
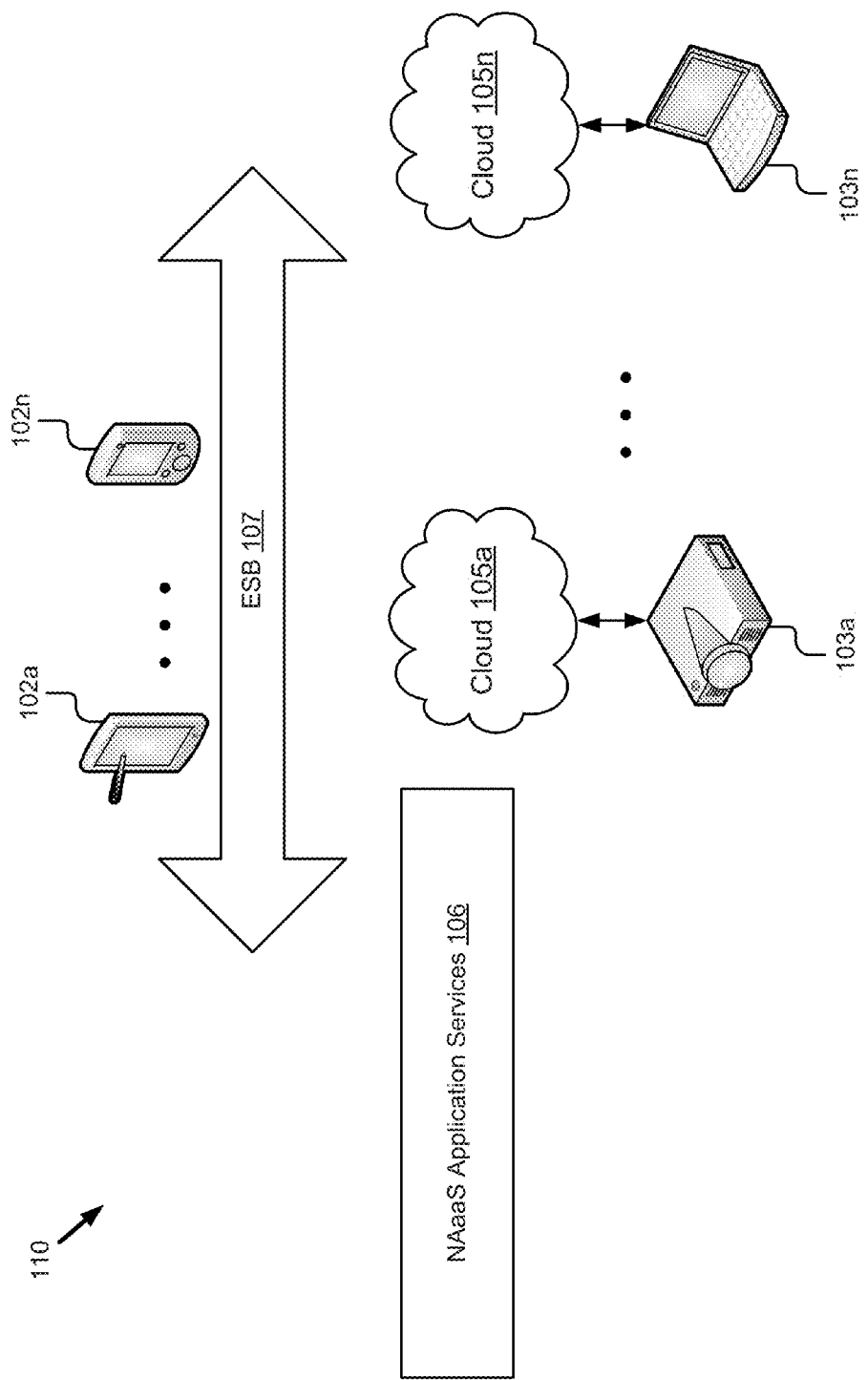
FIG. 1B is a high-level block diagram illustrating another embodiment of a system for generating user profiles.

FIG. 1B illustrates another high-level block diagram of a system 110 for generating user profiles for human resources according to one embodiment. The illustrated embodiment of the system 110 comprises: user devices 102a-102n as a first layer, the enterprise service bus 107 as a second layer and the NAaaS application services 106, the collaborative computing devices 103a-103n and their corresponding server clouds 105a-105n as a third layer. Each one of the server clouds 105a-105n store a copy of the media type and index the media type associated with the corresponding collaborative computing devices 103a-103n whenever the collaborative computing devices 103a-103n execute a transaction in response to a request. For example, a projector cloud server stores a projected presentation program document, a video conferencing cloud server stores a video recording of the video conference and an interactive whiteboard cloud server stores an image of the interactive whiteboard.

The enterprise service bus 107 layer processes requests coming in from the user devices 102a-102n layer and relays the requests to the NAaaS application services 106 for processing and the collaborative computing devices 103a-103n and their corresponding server clouds 105a-105n. In one embodiment, the enterprise service bus 107 layer comprises one or more ports that provide an interface for user applications on the user devices 102a-102n to connect with the enterprise service bus 107 layer to send messages and receive responses. In another embodiment, the enterprise service bus 107 layer comprises one or more ports to communicate with the NAaaS application services 106 layer and the collaborative computing devices 103. In one embodiment, a port on the enterprise service bus 107 may be of a particular port type that handles only messages and communications of a particular message format and communication protocol of a user application. In another embodiment, a port on the enterprise service bus 107 may be of a universal port type that includes a generic interface to the enterprise service bus 107 and can handle any messaging format and communication protocol combination.

Enterprise Service Bus

Figure 2A:
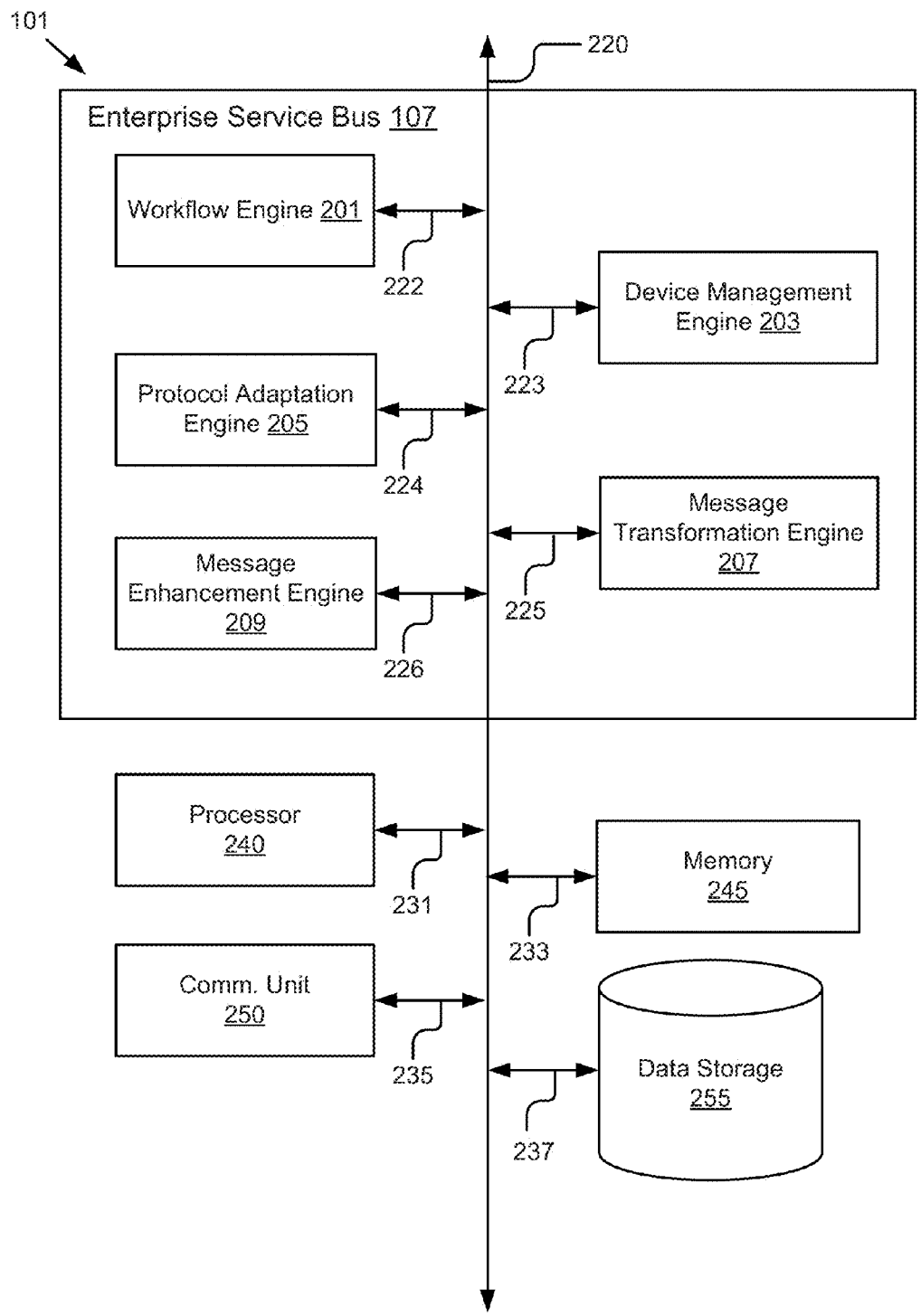
FIG. 2A is a block diagram illustrating one embodiment of an enterprise service bus.

Referring now to FIG. 2A, an example of the enterprise service bus 107 is shown in more detail. FIG. 2A is a block diagram of a NAaaS middleware server 101 that includes: a processor 240, a memory 245, a communication unit 250, a data storage 255 and the enterprise service bus 107.

The processor 240, the memory 245, the communication unit 250, a data storage 255 and the enterprise service bus 107 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the NAaaS middleware server 101 via signal line 231. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the NAaaS middleware server 101 via signal line 233. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as images, videos, or documents from a plurality of user devices 102a-102n. The communication unit 250 also receives requests for user profiles associated with a skill from the search server 120. The communication unit 250 transmits information to the plurality of collaborative computing devices 103a-103n. For example, the communication unit 250 transmits graphical data for displaying images or videos. The communication unit 250 is coupled to the bus 220 for communication with the other components of the NAaaS middleware server 101 via signal line 235.

In one embodiment, the communication unit 250 includes a port for direct physical connection to the user devices 102, the collaborative computing devices 103, the NAaaS application server 123, the search server 120 or to another communication channel. For example, the communication unit 250 includes an RJ14 or similar port for wired communication with the ESB 107. In another embodiment, the communication unit 250 includes a wireless transceiver for exchanging data with the user devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, FTP, HTTP, HTTPS and SMTP as will be understood to those skilled in the art.

The data storage 255 is a non-transitory memory that stores data for the functionality of the NAaaS middleware server 101. The data storage 255 is coupled to the bus 220 for communication with other components of the NAaaS middleware server 101 via signal line 237.

In one embodiment, the data storage 255 stores a library of communication protocols and messaging formats for protocol conversion. The communication protocols and messaging formats that the data storage 255 stores include, for example, Simple Object Access Protocol (SOAP), eXtensible Markup Language (XML), Java Message Service (JMS), File Transfer Protocol (FTP), Hypertext Transfer Protocol (HTTP), Message Queue (MQ), Internet Inter-Orb Protocol (HOP), Representational State Transfer (REST), JavaScript Object Notation (JSON), Distributed Component Object Model (DCOM), etc. In some embodiments, the protocol adaptation engine 205 accesses the protocols to convert requests into a protocol that is compatible with the recipient.

The enterprise service bus 107 includes: a workflow engine 201, a device management engine 203, a protocol adaptation engine 205, a message transformation engine 207 and a message enhancement engine 209. These components of the enterprise service bus 107 are communicatively coupled to each other via the bus 220.

The workflow engine 201 is software and routines for performing basic enterprise service bus functionalities and for handling communications between the components of the NAaaS middleware server 101 and other components of the system 100. In one embodiment, the workflow engine 201 is a set of instructions executable by the processor 240 to provide the functionality described below for receiving a request, routing the request, performing several steps and interacting with the NAaaS application services 106 and the collaborative computing devices 103 to satisfy the request. In either embodiment, the workflow engine 201 is adapted for cooperation and communication with the processor 240, the communication unit 250 and other components of the NAaaS middleware server 101 via the signal line 222.

The workflow engine 201 receives a request, processes the request and communicates with the NAaaS application services 106 and the collaborative computing devices 103 to complete the request. For example, the workflow engine 201 receives a request from a user device 102 for one of the collaborative computing devices 103 to project an image. The workflow engine 201 authenticates the user associated with the user device 102 by interacting with the user management service 211 that is part of the NAaaS application services 106, instructing the device usage analytics service 213 to log the command, a user identifier for the user associated with the user device 102, the date and time of the request and the IP address of the user device 102, copying the image that the user sent to the repository by interacting with the media repository service 215, performing optical character recognition of the image and indexing keywords in the image by interacting with the media analysis service 217 and transmits the image to the collaborative computing device 103 for projection.

The workflow engine 201 receives information via the communication unit 250 and transmits the information to the appropriate component of the enterprise service bus 107 or components of the system 100. In one embodiment, the workflow engine 201 receives a request to transmit media to a collaborative computing device 103. The workflow engine can receive one or more types of media. The workflow engine 201 routes or transmits the media to the collaborative computing device 103. For example, the workflow engine 201 receives an image from a user device 102 (e.g., a smart phone) for display by a collaborative computing device 103 (e.g., a projector or a monitor).

In another embodiment, the workflow engine 201 receives a request from a search server 120 for a list of users that are knowledgeable about a particular area. The workflow engine 201 transmits the request to the NAaaS application services 106 to perform a search of the data storage 268 based on search terms included in the request. Once the NAaaS application services 106 return matching results, the workflow engine 201 transmits the results to a requestor at the user device 102 that submitted the request to the search server 120.

The requestor may provide the search query for experts or media associated with a subject. For example, the requestor may request to find users or media associated with Linux. The search query may include text. For example, the requestor provides the word "Linux" in a text input box of a search user interface generated by the user interface engine 121 on the search server 120. The search query may include visual information. For example, the requestor may provide an image or video of Tux, the mascot of Linux. The search query may include audio of a voice. For example, the requestor may provide audio of a voice saying the word "Linux." The workflow engine 201 transmits the search query to the NAaaS application services 106 for processing.

The device management engine 203 is code and routines for determining functionality associated with the one or more types of devices. In one embodiment, the device management engine 203 is a set of instructions executable by the processor 240 to provide the functionality described below for determining functionality associated with the one or more types of devices. In another embodiment, the device management engine 203 is stored in the memory 245 and is accessible and executable by the processor 240. In either embodiment, the device management engine 203 is adapted for cooperation and communication with the processor 240, the communication unit 250, the workflow engine 201 and other components of the NAaaS middleware server 101 via signal line 223.

In one embodiment, the device management engine 203 determines a list of functions associated with each of the plurality of devices. For example, the list of functions include power on, power off, projection, zoom, enhance, automatic focus, print, two-way video recording and transmission, two-way audio recording and transmission, language translation, text to speech translation and speech to text translation, etc.

The protocol adaptation engine 205 is software and routines for adapting and translating protocols. In one embodiment, the protocol adaptation engine 205 is a set of instructions executable by the processor 240 to provide the functionality described below for adapting and translating protocols. In either embodiment, the protocol adaptation engine 205 is adapted for cooperation and communication with the processor 240, the communication unit 250 and other components of the NAaaS middleware server 101 via the signal line 224.

In one embodiment, the protocol adaptation engine 205 receives a request from the workflow engine 201 in a first communication protocol and performs adaptation and translation to make the communication protocol compatible with the recipient of the request. For example, the protocol adaptation engine 205 receives an HTTP request from the user device 102 to "turn off" a projector. The projector communicates using TCP. The protocol adaptation engine 205 adapts an HTTP request to be forwarded to the projector using the TCP protocol.

The message transformation engine 207 is software and routines for transforming messages. In one embodiment, the message transformation engine 207 is a set of instructions executable by the processor 240 to provide the functionality described below for transforming messages. In either embodiment, the message transformation engine 207 is adapted for cooperation and communication with the processor 240, the communication unit 250 and other components of the NAaaS middleware server 101 via the signal line 225. For example, the message transformation engine 207 transforms the payload from an eXtensible Markup Language (XML) to JavaScript Object Notation (JSON).

The message enhancement engine 209 is software and routines for enhancing messages. In one embodiment, the message enhancement engine 209 is a set of instructions executable by the processor 240 to provide the functionality described below for enhancing messages. In either embodiment, the message enhancement engine 209 is adapted for cooperation and communication with the processor 240, the communication unit 250 and other components of the NAaaS middleware server 101 via the signal line 226. The message enhancement engine 209 can also enhance the message by adding information not originally present in the request.

NAaaS Application Services

Figure 2B:
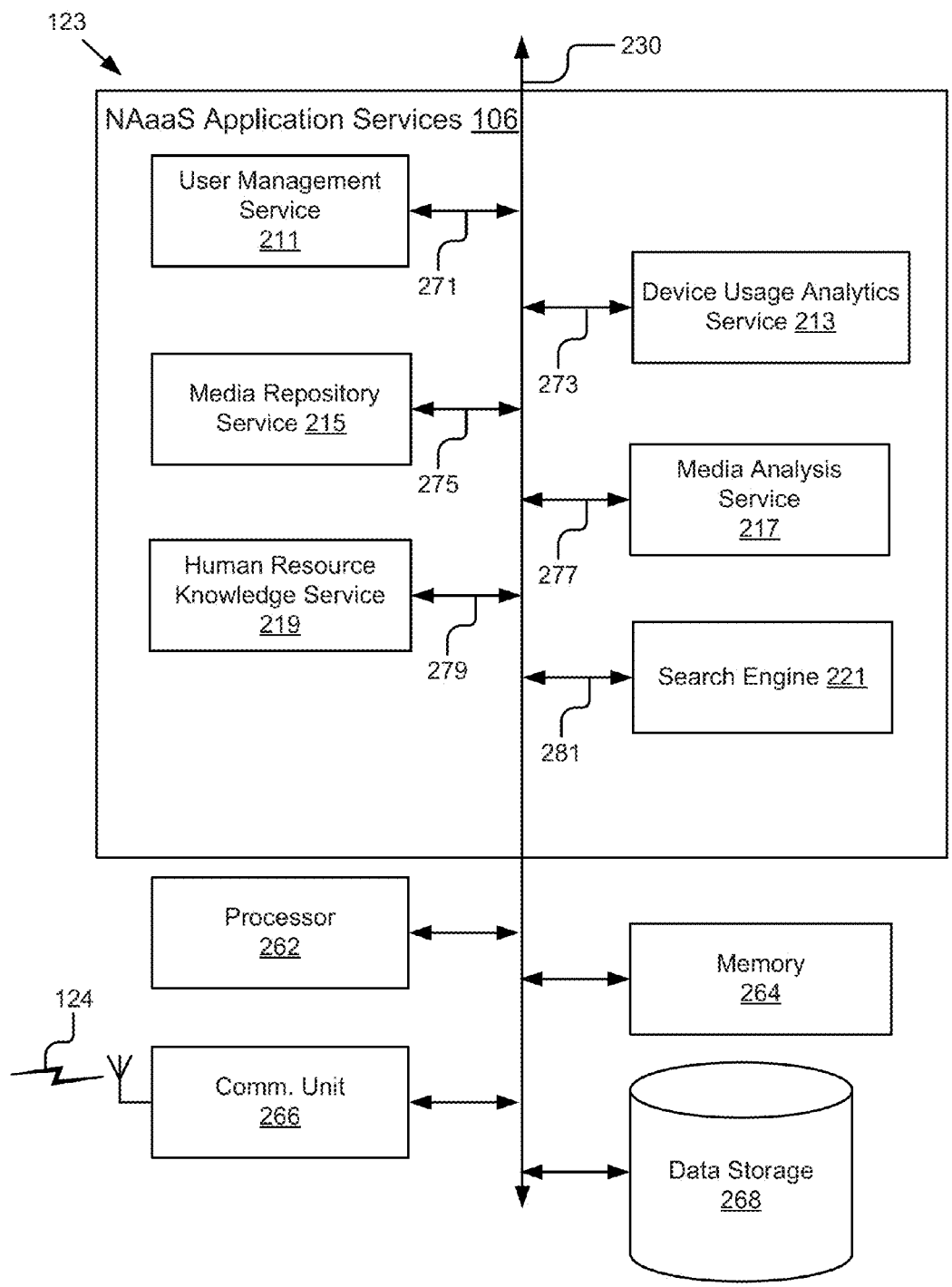
FIG. 2B is a block diagram illustrating one embodiment of a Network Appliance as a Service application.

FIG. 2B illustrates one embodiment of a NAaaS application server 123 that comprises NAaaS application services 106, a processor 262, a memory 264, a communication unit 266 and data storage 268. Some of the components of the NAaaS application server 123 have similar function and form as has been described above with reference to FIG. 2A so like reference numbers and terminology have been used to indicate similar functionality. For example, the communication bus 230, the processor 262, the memory 264 and the communication unit 266 are similar to that described above with reference to FIG. 2A so they will not be described here again.

In one embodiment, the data storage 268 captures device usage entries, an index of keywords related to the media, an index of the media, the media and user profiles. The device usage entry describes transactions executed on the collaborative computing devices 103 and user identifiers associated with the transaction. In some embodiments, the device usage entry includes multiple user identifiers. For example, the device usage entry includes a user identifier for the presenter, e.g. a first user that sends a request from a user device 102 to project an image, video or document to a collaborative computing device 103 and a user identifier for the author of the media. The device usage entry includes the type of request (e.g., project, power on, power off, etc.), the type of device involved in the exchange of request and service (e.g., smart phone, projector, etc.), an IP address for the device, a measure of device resource spent (e.g., time, power, etc.), a type of functionality of the device used (e.g., auto-focus, enhance, imaging, etc.), a type of media exchanged (e.g., a presentation program document, a text document, a spreadsheet document, a video recording, an audio recording, an image, etc.), etc.

In one embodiment, the data storage 268 stores an index of keywords associated with the media. For example, media may include images of a document or slide show, interactive whiteboard images, video, audio, etc. In some embodiments, the index of keywords includes records of keywords and/or synonyms and an association between a keyword and one or more related media. For example, a record may include the keyword and a pointer data associated with the one or more related media. Pointer data may include document/file identifiers or uniform resource locators for locating the related media in the cloud. In one embodiment, the data storage 268 receives the index of keywords from the human resource knowledge service 219.

The data storage 268 stores an index of media. In one embodiment, the index of media includes records for each media including metadata for each media. For example, the metadata may include pointer data for accessing the original media (e.g. a full presentation instead of merely an image of a slide of the presentation) from the cloud, an author of the media, etc. In one embodiment, the metadata also includes results from the media analysis service 217, such as a text version of the image. In one embodiment, the data storage 268 also stores a copy of the media included in the requests. For example, the data storage 268 receives a copy of the media from the media repository service 215.

The data storage 268 stores user profiles. In one embodiment, the user profiles include records for each user. The records for each user may include a graphical representation of the user (e.g. a photo of the user), name, a title, keywords related to the user, media associated with the user (e.g., media authored by the user or media presented by the user), presentations associated with the user, etc. In one embodiment, the keywords related to the user include a list of keywords.

In one embodiment, the data storage 268 stores thesaurus data. In one embodiment, the NAaaS application services 106 query the thesaurus data for synonyms for keywords related to content in the media.

The NAaaS application services 106 is a collection of individual lower-level services with individual application programming interfaces (APIs) that are composed by the enterprise service bus 107 to deliver higher services. For example, a "project" command sent by a user device 107 to the enterprise service bus 107 will invoke a module in the NAaaS application services 106 that will authenticate the user device, identify text in the media and save the document in the data storage 268. The services do not communicate with each other. Instead the services receive instructions from the enterprise service bus 107, complete the requested task, save data in the data storage 268 if applicable and return information to the enterprise service bus 107.

In one embodiment the services include a user management service 211, a device usage analytics service 213, a media repository service 215, a media analysis service 217, a human resource knowledge service 219 and a search engine 221. Persons of ordinary skill in the art will recognize that the NAaaS application services 106 can compose additional services to complete requests.

The user management service 211 is code and routines for registering users in the network 104 and performing authentication of users. In one embodiment, the user management service 211 is a set of instructions executable by the processor 262 to provide the functionality described below for registering users. In another embodiment, the user management service 211 is stored in the memory 264 and is accessible and executable by the processor 262. In either embodiment, the user management service 211 is adapted for cooperation and communication with the processor 262 and the communication unit 266 via signal line 271.

The user management service 211 receives user information and generates a user profile. For example, the user management service 211 receives a name of the user, a user name, a password and any user devices 102 that are associated with the user.

The user management service 211 performs authentication. For example, a user enters login credentials into a user interface on the user device 102. The user device 102 transmits the login credentials to the enterprise service bus 107, which requests that the user management service 211 authenticate the user based on the login credentials. The user management service 211 identifies the user associated with the user device 102, compares the login credentials to the user profile and either sends a confirmation back to the enterprise service bus 107 that the login credentials were correct or a notification that there was a login error. The confirmation includes the user identification associated with the user.

The device usage analytics service 213 is code and routines for logging device usage entries associated with the requests in the network 104. In one embodiment, the device usage analytics service 213 is a set of instructions executable by the processor 262 to provide the functionality described below for logging device usage entries. In another embodiment, the device usage analytics service 213 is stored in the memory 264 and is accessible and executable by the processor 262. In either embodiment, the device usage analytics service 213 is adapted for cooperation and communication with the processor 262 and the communication unit 266 via signal line 273.

The device usage analytics service 213 receives a request and a user identifier associated with the request and logs the metadata associated with the request as a device usage entry. If the user associated with request is different from the author of the media, the device usage entry includes a user identifier for both the presenter and the author of the media. For example, a doctor gives a talk about a medical subject to residents at a hospital by using slides that are transmitted from the professor's user device 102 (e.g. a laptop) to a collaborative computing device 103 (e.g. a projector). Each time the doctor wants to display a slide on the projector, the doctor sends a request to display an image of the slide from the laptop to the projector. The enterprise service bus 107 transmits the request to the user management service 211, which identifies the user associated with the user device 102. The enterprise service bus 107 receives a confirmation of authentication from the user management service 211 and an identity of the user and transmits the request and user identifier to the device usage analytics service 213, which logs a device usage entry. In one embodiment, the device usage entry includes a user identifier for the user associated with the user device 102, an author of the media (if different), a set of actions performed on the collaborative computing device 103 and a unique identifier referring to the stored media in the data storage 268.

The media repository service 215 is code and routines for storing media associated with a request in data storage 268. In one embodiment, the media repository service 215 is a set of instructions executable by the processor 262 to provide the functionality described below for storing media. In another embodiment, the media repository service 215 is stored in the memory 264 and is accessible and executable by the processor 262. In either embodiment, the media repository service 215 is adapted for cooperation and communication with the processor 262 and the communication unit 266 via signal line 275.

The media repository service 215 receives a request from the enterprise service bus 107 that includes media. The media repository service 215 generates a unique identifier associated with the media and stores the media in the data storage 268.

The media analysis service 217 is code and routines for analyzing media. In one embodiment, the media analysis service 217 is a set of instructions executable by the processor 262 to provide the functionality described below for analyzing media. In another embodiment, the media analysis service 217 is stored in the memory 264 and is accessible and executable by the processor 262. In either embodiment, the media analysis service 217 is adapted for cooperation and communication with the processor 262 and the communication unit 266 via signal line 277.

The media analysis service 217 receives media associated with a request from the enterprise service bus 107. For example, the media analysis service 217 receives an image that was captured from a slide. The media analysis service 217 applies optical character recognition to the image to identify text associated with the image. The media analysis service 217 stores the text in the data storage 268. In one embodiment, the media analysis service 217 converts content from the image including handwritten, typewritten or printed text to machine-encoded text.

In one embodiment, the media analysis service 217 receives video and/or audio data. The media analysis service 217 may identify a user associated with the video and/or audio data received from a video conferencing device. For example, a video may include the doctor from the example above giving the presentation in front of an interactive whiteboard. The media analysis service 217 may identify the doctor based on performing facial recognition on the video data or performing voice analysis on the audio data. In another embodiment, the media can be provided by audience members that participate in an event. The media analysis service 217 determines an event. For example, the media analysis service 217 determines a presentation. The media analysis service 217 determines audience members at an event. The media analysis service 217 determines which audience members participated in the event. In one embodiment, the media analysis service 217 determines which audience members participated in an event based on performing facial recognition from video data or performing voice analysis on the audio data.

In one embodiment, the media analysis service 217 receives video data of an event or a presentation from the enterprise service bus 107. For example, the video includes a person in front of an interactive whiteboard for presenting information. The media analysis service 217 may perform optical character recognition on one or more frames of the video. For example, the media analysis service 217 performs optical character recognition on the information presented on the interactive whiteboard. In another embodiment, the media analysis service 217 receives audio data. The media analysis service 217 may identify text from the audio data by using speech-to-text technology.

The human resource knowledge service 219 is software and routines for identifying keywords in the media, indexing data related to keywords in the media and associating the keywords with user profiles. In one embodiment, the human resource knowledge service 219 is a set of instructions executable by the processor 262 to provide the functionality described below for indexing data related to keywords. In another embodiment, the human resource knowledge service 219 is stored in the memory 264 and is accessible and executable by the processor 262. In either embodiment, the human resource knowledge service 219 is adapted for cooperation and communication with the processor 262 and the communication unit 266 via the signal line 279.

The human resource knowledge service 219 identifies keywords in the media. For example, a professor may give a presentation related to one or more subjects to his/her class. The classroom may include user devices 102 and collaborative computing devices 103 to enhance the presentation. The professor may use a user device 102 (e.g., a smart phone) to send an image of a document or a slide from a slide show for display on a collaborative computing device 103 (e.g., a projector). The enterprise service bus 107 receives the request to project an image from the user device 102 and transmits the image to the media analysis service 217 to identify text in the image. The enterprise service bus 107 then sends the text to the human resource knowledge service 219 for identifying keywords. In another embodiment, the human resource knowledge service 219 receives text that was extracted from video and/or audio data from the enterprise service bus 107 that was captured by a collaborative computing device 103 during the presentation. For example, the collaborative computing device 103 is a video conferencing device for capturing video and/or audio during the presentation. The video conferencing device may capture video of the professor or another user writing on an interactive whiteboard. The video conferencing device may capture audio of the professor or another user (e.g., an audience member) speaking during the presentation.

The human resource knowledge service 219 determines one or more keywords relating to content in the media. In one embodiment, the human resource knowledge service 219 determines one or more parts of the media. For example, the human resource knowledge service 219 determines a title, a table of contents, an overview, a key information section, etc. of one or more slides of a slide show. The human resource knowledge service 219 may determine parts of the one or more slides based on location of text, formatting of text, a position of a slide in the slide show, etc. For example, the title of a slide or slide show may appear at the top of a first slide of the slide show appearing in a bold font. The title may include text having a size that is larger relative to other text on the slide or other slides. In another example, a slide having a position at the beginning of the slide show may include an overview of the slide show. In another example, the human resource knowledge service 219 determines a key information section based on identifying text having one or more bullet points.

The human resource knowledge service 219 determines weights for the keywords. In one embodiment, the human resource knowledge service 219 determines the weights based on the parts. For example, the human resource knowledge service 219 determines a higher weight for a keyword from the title of a slide show than other parts (e.g., text) of the slide show. In another embodiment, the human resource knowledge service 219 determines the weights based on a count associated with a keyword. For example, the human resource knowledge service 219 identifies the number of times each keyword appears in the media.

In one embodiment, the human resource knowledge service 219 determines related content. For example, the human resource knowledge service 219 determines synonyms for the keywords. In one embodiment, the human resource knowledge service 219 performs a search in a thesaurus. In another example, the human resource knowledge service 219 determines related content based on a knowledge graph.

The human resource knowledge service 219 indexes the keywords and synonyms. In one embodiment, the human resource knowledge service 219 indexes the keywords and synonyms by excluding extraneous words. Extraneous words may include common words (e.g., "a" and "the"). In another embodiment, the human resource knowledge service 219 selects a top number of keywords for the index. The human resource knowledge service 219 may select a top number of keywords based on the weights for each keyword. In one embodiment, the human resource knowledge service 219 stores an index of keywords and synonyms in the data storage 268. For example, the human resource knowledge service 219 stores the index in one or more tables of a database in data storage 268. In one embodiment, the index of keywords includes data describing an association between a keyword and the media. For example, the index includes records with a keyword and pointer data (e.g., uniform resource locator or document/file identifier) associated with the media. The pointer data may include data for locating the media. In one embodiment, a keyword may be associated with a plurality of media.

The human resource knowledge service 219 updates a user profile for an author or presenter based on one or more keywords. A user profile for the author or presenter may include a list of keywords relating to content in the media associated with the author or presenter. The human resource knowledge service 219 updates the user profile by adding the one or more keywords to the list of keywords to the user profile associated with the unique user identifier. In one embodiment, the user profile for the author includes metadata describing the media associated with the author or presenter. The metadata may include the list of keywords, presentation information (e.g., a date, location and device information), media information (e.g., uniform resource locator or document/file identifier of media authored), etc. If the author gives the same presentation information at multiple events, in one embodiment, the presentation information includes multiple dates and locations associated with the presentation.

The search engine 221 is software and routines for identifying user profiles and/or media related to a search query. In one embodiment, the search engine 221 is a set of instructions executable by the processor 262 to provide the functionality described below for identifying user profiles and/or media related to a search query. In another embodiment, the search engine 221 is stored in the memory 264 and is accessible and executable by the processor 262. In either embodiment, the search engine 221 is adapted for cooperation and communication with the processor 262 and the communication unit 266 via the signal line 281. The search engine 221 is described below in more detail with reference to FIG. 2C.

Figure 2C:
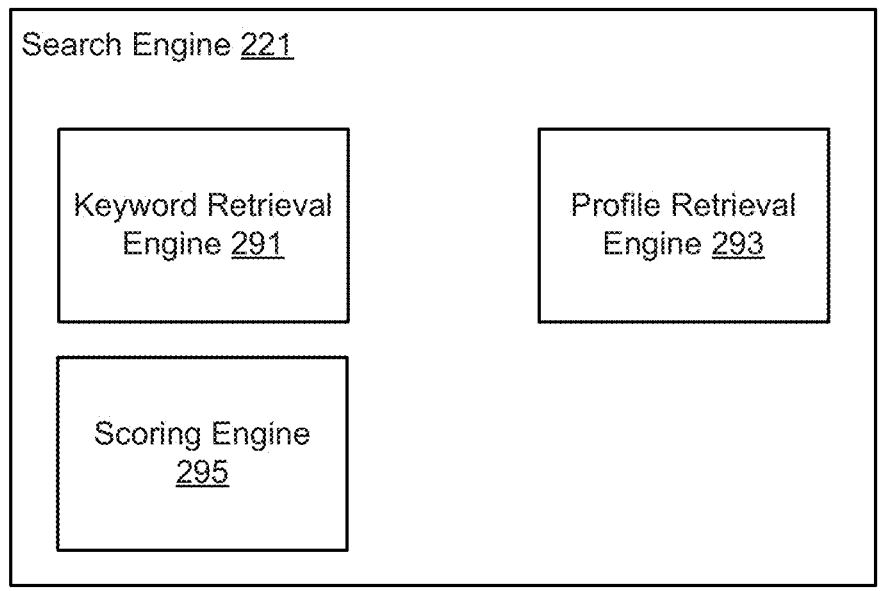
FIG. 2C is a block diagram illustrating one embodiment of a search engine.

FIG. 2C is a block diagram of one embodiment of a search engine 221. In one embodiment, the search engine 221 includes a keyword retrieval engine 291, a profile retrieval engine 293 and a scoring engine 295. However, in other embodiments, the search engine 221 can include different and/or additional modules than the ones depicted in FIG. 2C.

The keyword retrieval engine 291 receives a search query from a requestor. For example, the keyword retrieval engine 291 receives the search query from an enterprise service bus 107 that originated at a search server 120. In one embodiment, the search query includes text. For example, the requestor provides the word "Linux" in a text input box of a search user interface. In another embodiment, the search query includes visual information. For example, the requestor may provide an image or video of a mascot of Linux. In another embodiment, the search query includes audio of a voice. For example, the requestor may provide audio of a voice saying the word "Linux."

The keyword retrieval engine 291 identifies, from an index, one or more keywords that match a term in the search query. For example, the keyword retrieval engine 291 identifies one or more keywords from an index of keywords and synonyms stored on the data storage 268. In one embodiment, the keyword retrieval engine 291 identifies keywords by searching for exact matches to a term in the search query. In another embodiment, the keyword retrieval engine 291 identifies keywords by searching for keywords similar to the term in the search query. For example, if the requestor provides the term "open source operating system," the keyword retrieval engine 291 may identify "Linux" as a keyword from the index.

The profile retrieval engine 293 identifies media associated with the keywords and user profiles for authors or presenters of the media. In one embodiment, the index of keywords includes data describing an association between a keyword and media. The profile retrieval engine 293 identifies the media from the records in the index. In one embodiment, the profile retrieval engine 293 identifies user profiles by matching authors or presenters of the media based on document/file identifiers in the user profiles.

The scoring engine 295 determines a score for each author or presenter based on the media. In one embodiment, the scoring engine 295 identifies a number of times a keyword appears in the media. For example, the scoring engine 295 determines the number of times the keyword appears in an image of one or more slides or an interactive whiteboard. In another example, the scoring engine 295 determines the number of times the author says the keyword in audio. In another embodiment, the scoring engine 295 determines the score for each author based on a number of times that the author gave a presentation that uses the keyword. In another embodiment, the scoring engine 295 determines the score based on a recency of presentations by the author or presenter. In one embodiment, the scoring engine 295 ranks the authors or presenters based on the score for each author or presenter.

In some embodiments, the scoring engine 295 determines a level of expertise associated with the keyword for each author or presenter. In one embodiment, the scoring engine 295 determines the level of expertise associated with the keyword based on the score for an author or presenter. For example, if the score exceeds an expert threshold, then the scoring engine 295 may determine an expert level for the author or presenter. In another embodiment, the scoring engine 295 determines the level based on the ranking for each author or presenter. For example, the scoring engine 295 may determine an expert level for a top-ranked author or presenter. The level may be nominal (e.g., novice, expert), numerical (e.g., 1, 2, 3, 4) or visual (e.g., the scoring engine 295 instructs the user interface engine 121 to display a color associated with a level such as green for an expert and red for a novice). In one embodiment, the scoring engine 295 filters or selects user profiles based on the level or rank of an author or presenter.

Figure 3:
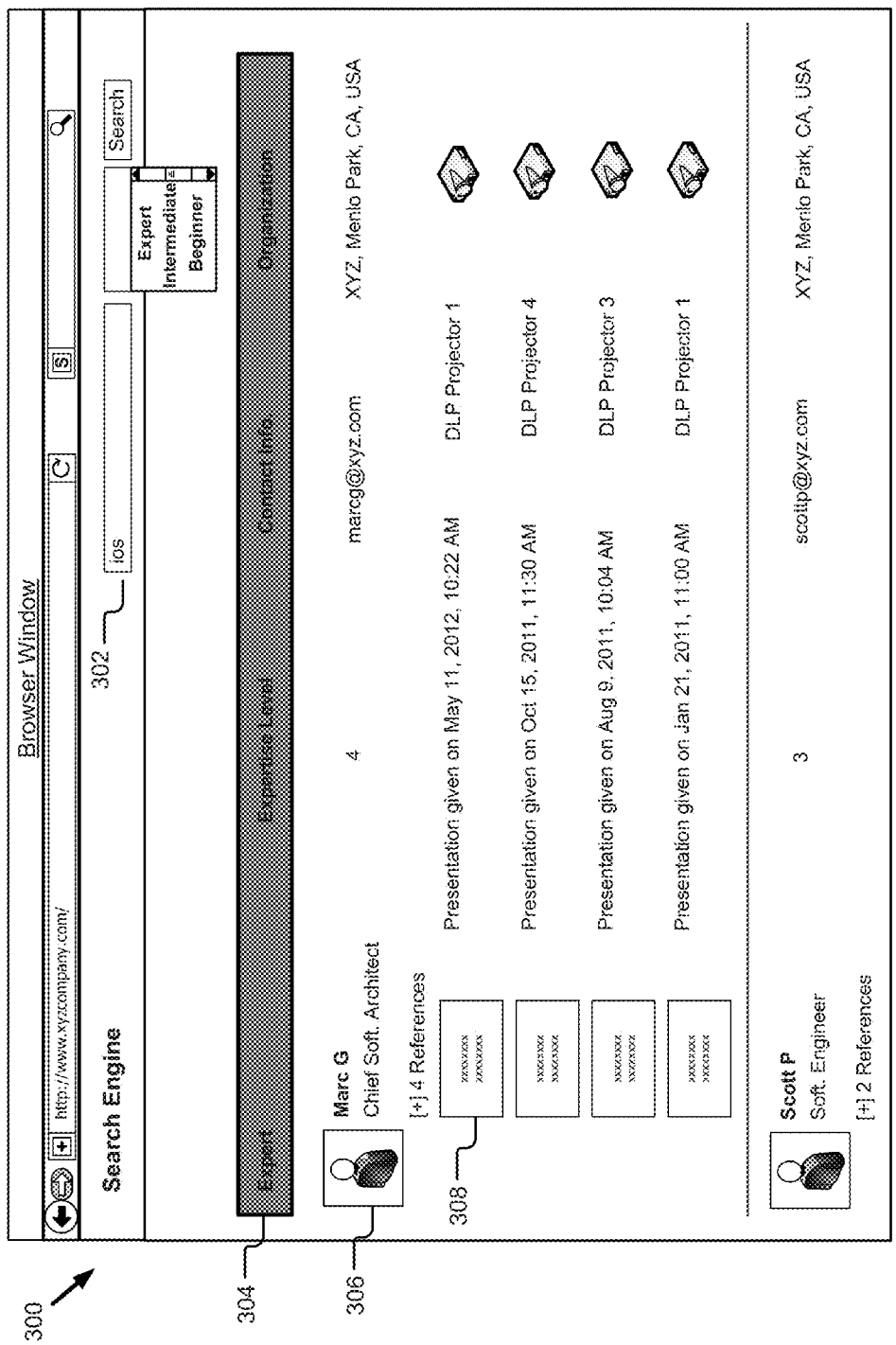
FIG. 3 is a graphic representation of one embodiment of a search user interface.

FIG. 3 is a graphic representation 300 of an example search user interface that is generated by the user interface engine 121 on the search server 120. The search user interface includes an area 302 for entering search query information and a results table 304 that includes search query results. The area 302 includes an input box for entering a search query including terms. The illustrated area 302 includes an input for filtering a level of authors or presenters. In the illustrated example, the search user interface includes an input for querying experts, intermediate and/or beginners that are knowledgeable about mobile operating systems. In one embodiment, a user clicks the "search" button to transmit the search query information. In the illustrated example, the search interface includes a results table 304 for displaying results of a query. The results table 304 includes user information 306 for one or more users related to the search query. The user information 306 includes a graphical representation of the user (e.g. a photo of the user), a name, a title, a level of expertise, contact information and organization information. The results table 304 includes media information 308 for one or more media associated with the user and related to the search query. The media information 308 includes a graphical image of the media, presentation information, device information and a graphical image of the device. In one embodiment, the search user interface includes ordered search results. For example, the search results can be ordered based on an expertise level of a user. In the illustrated example of the search user interface, the user Marc G appears first based on having a higher expertise level than user Scott P.

Methods

Figure 4:
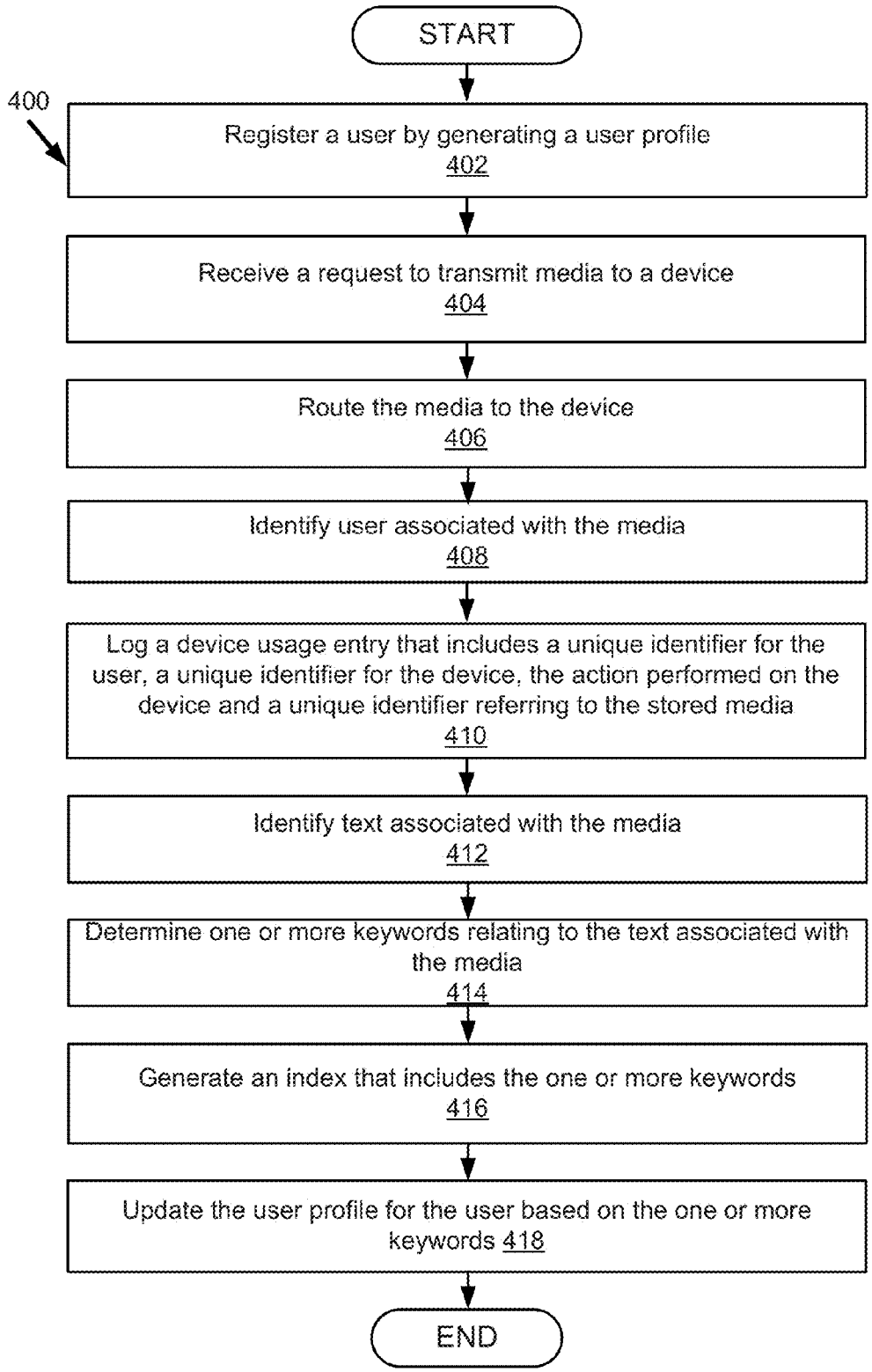
FIG. 4 is a flow diagram of an embodiment of a method for indexing presentations.
Figure 5:
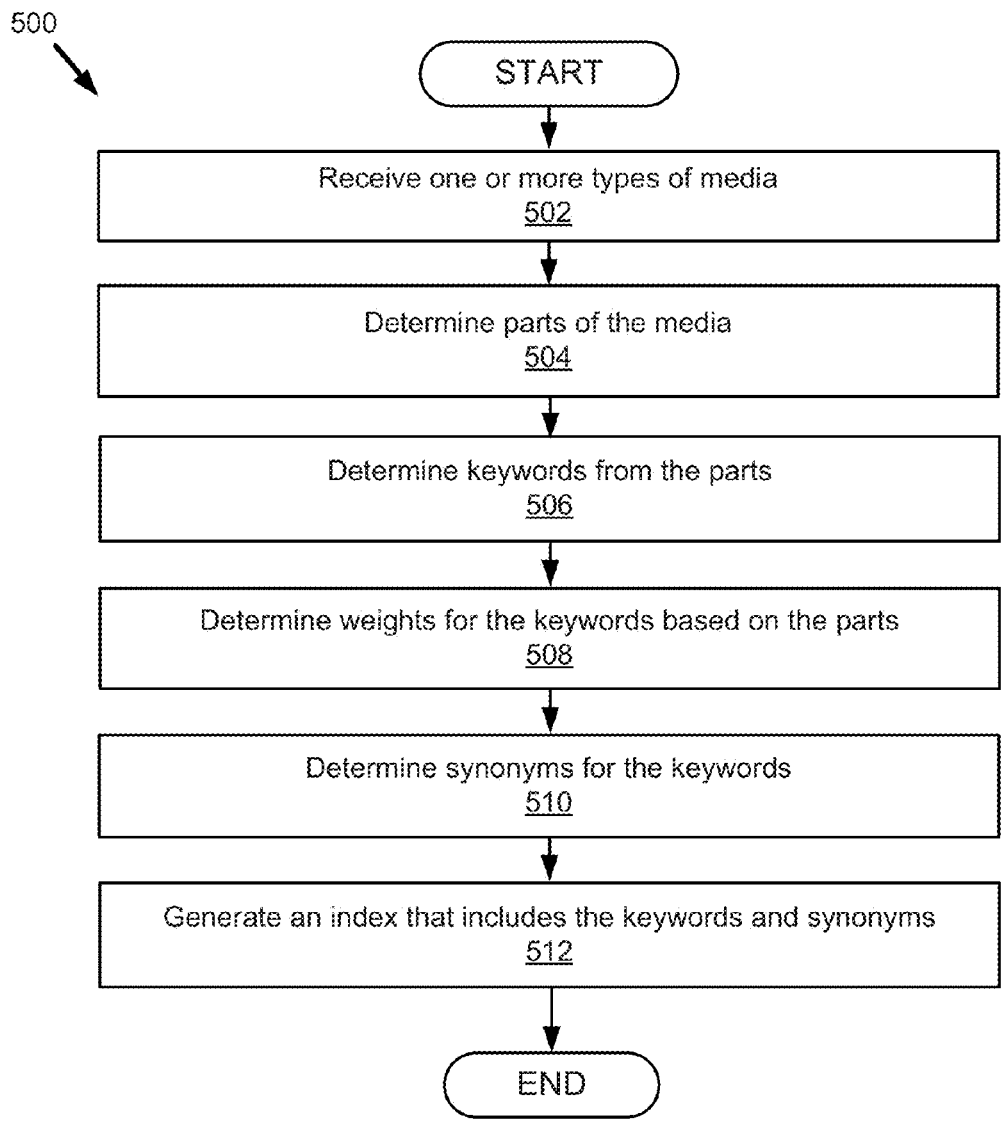
FIG. 5 is a flow diagram of another embodiment of a method for indexing presentations.
Figure 6:
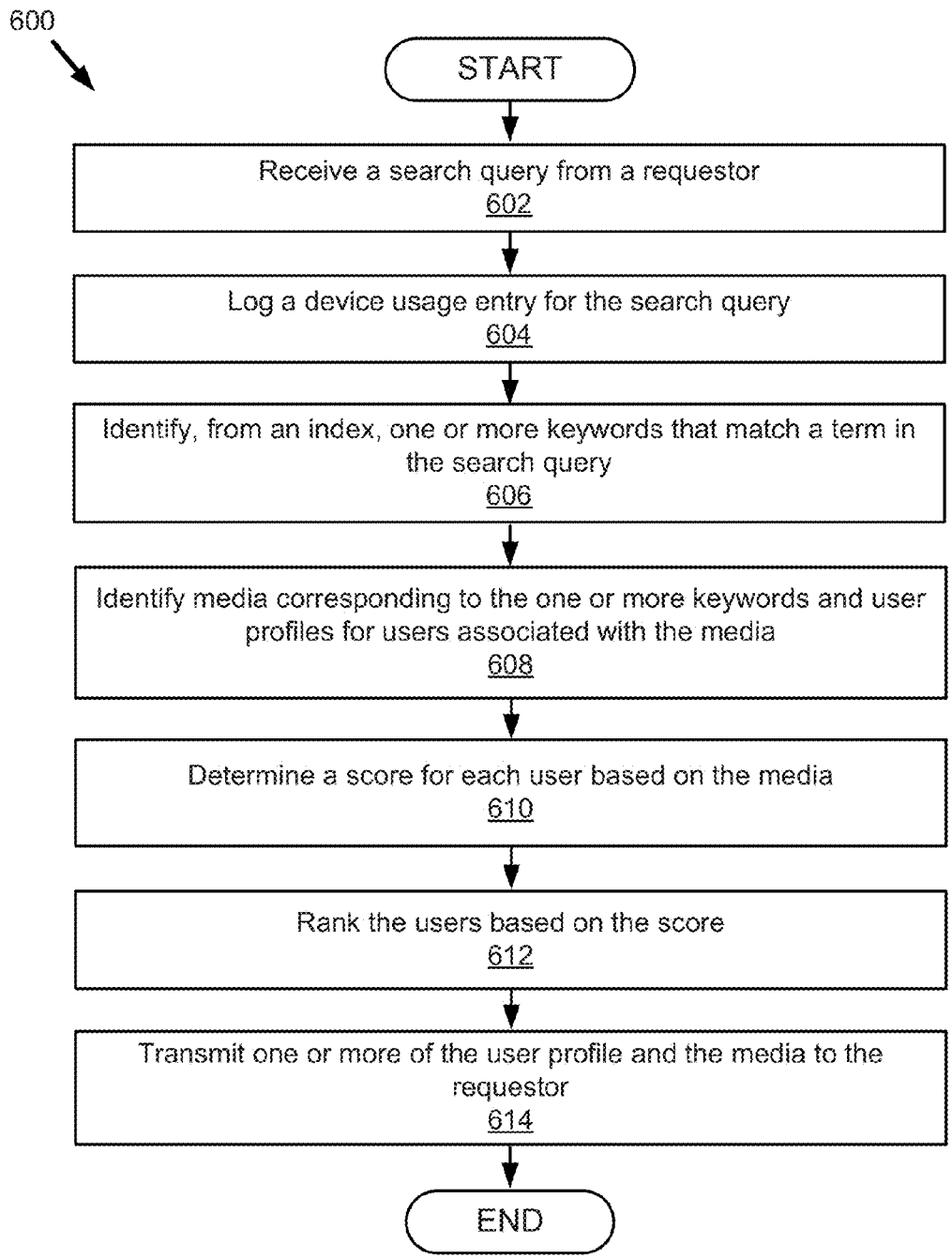
FIG. 6 is a flow diagram of an embodiment of a method for querying for users that have a skill.

Referring now to FIGS. 4-6, various embodiments of the methods of the invention will be described. FIG. 4 is a flow diagram 400 of an embodiment of a method for indexing media using an enterprise service bus 107 and NAaaS application services 106. The enterprise service bus 107 includes a workflow engine 201, a device management engine 203, a protocol adaptation engine 205, a message transformation engine 207 and a message enhancement engine 209. The NAaaS application services 106 include a user management service 211, a device usage analytics service 213, a media repository service 215, a media analysis service 217, a human resource knowledge service 219 and a search engine 221.

The workflow engine 201 receives user information from a user associated with a user device 102. The workflow engine 201 instructs the user management service 211 to register the user. The user management service 211 registers 402 the user by generating a user profile. The user profile includes information about the user, for example, the user's name, a unique identifier associated with the user, the user's login information, etc.

The workflow engine 201 receives 404 a request to transmit media to a device. For example, the user device 102 transmits a request to the workflow engine 201 for instructing the collaborative computing device 103 to project an image. The workflow engine 201 routes 406 the media to the device. The workflow engine 201 instructs the user management service 211 to identify 408 the user associated with the media. The workflow engine 201 instructs the device usage analytics service 213 to log 410 a device usage entry that includes a unique identifier for the user, a unique identifier for the device, the action performed on the device and a unique identifier referring to the stored media. If the author of the media is different from the user that submitted the request, the device usage analytics service 213 logs a device usage entry with a unique identifier for each user. In one embodiment, the workflow engine 201 receives the request during a presentation or meeting. For example, the presentation may include a professor giving a lecture related to one or more subjects. The professor uses a smart phone for requesting to transmit an image to a projector for display. The image may include one or more slides related to the lecture.

The workflow engine 201 instructs the media analysis service 217 to identify 412 text associated with the media.

For example, the media analysis service 217 performs optical character recognition on images to identify text. In some embodiments, the images are frames of a video, for example, in a situation where the media analysis service 217 is identifying text from a video of an interactive whiteboard. In another example, the media analysis service 217 performs speech to text of audio associated with a presentation.

The workflow engine 201 instructs the human resource knowledge service 219 to determine 414 one or more keywords relating to the text associated with the media. The human resource knowledge service 219 generates 416 an index that includes the one or more keywords. In one embodiment, the human resource knowledge service 219 indexes the keywords and synonyms by excluding extraneous words. Extraneous words may include common words (e.g., "a" and "the"). In another embodiment, the human resource knowledge service 219 selects a top number of keywords for the index. The human resource knowledge service 219 may select a top number of keywords based on the weights for each keyword. The human resource knowledge service 219 updates 418 the user profile for the user based on the one or more keywords. In one embodiment, a user profile for the author may include a list of keywords associated with the author. The human resource knowledge service 219 updates the user profile by adding the one or more keywords to the list of keywords.

FIG. 5 is a more detailed flow diagram 500 of the step 414 in FIG. 4 of determining one or more keywords relating to content in the media and indexing presentations. This flow diagram assumes that the user was already registered and that the user management service 211 identified the author or the presenter of the media.

The human resource knowledge service 219 receives 502 one or more types of media from the workflow engine 201 that were converted to text by the media analysis service 217. For example, the human resource knowledge service 219 receives an image of a document or a slide show for display on a collaborative computing device 103 (e.g., a projector). The human resource knowledge service 219 determines 504 parts of the media. For example, the human resource knowledge service 219 determines a title, a table of contents, an overview, key information section, etc. of one or more slides of the slide show. The human resource knowledge service 219 determines 506 keywords from the parts. The human resource knowledge service 219 determines 508 weights for the keywords based on the parts. For example, the human resource knowledge service 219 determines a higher weight for a keyword from the title of a slide than other parts (e.g., text) of the slide show. The human resource knowledge service 219 determines 510 synonyms for the keywords. In one embodiment, the human resource knowledge service 219 performs a search in a dictionary of synonyms. The human resource knowledge service 219 generates 512 an index that includes the keywords and synonyms.

FIG. 6 is a flow diagram 600 of an embodiment of a method for querying for users that have a skill using a search server 120, an enterprise service bus 107 and a NAaaS application services 106. The search server 120 includes a user interface engine 121. The enterprise service bus 107 includes a workflow engine 201, a device management engine 203, a protocol adaptation engine 205, a message transformation engine 207 and a message enhancement engine 209. The NAaaS application services 106 include a device usage analytics service 213 and a search engine 221 that can be further subdivided into a keyword retrieval engine 291, a profile retrieval engine 293 and a scoring engine 295.

The workflow engine 201 receives 602 a search query from the user interface engine 121 and transmits the search query device usage analytics service 213 for logging a device usage entry. The device usage analytics service 213 logs 604 a device usage entry for the search query. For example, the request is an HTTP request for a search where the content of the message is:

```
{
    "naaasprotocol": "1.0",
    "service": {
        "category": "SEARCH",
        "type": "expertise",
        "arguments": {
            "query": "ios"
        }
    },
    "userId": "4"
}
```

Where "naaasprotocol" is a Web API version of the platform, "search" is the category of the action, "expertise" is the type of skill level, "userId" is the identifier of the user operating the user device 102 and "arguments" contains the search query, which is "ios" in this case.

The workflow engine 201 and transmits the search query to the search engine 221. For example, the requestor provides the word "iOS" in a text input box of a search user interface generated by the user interface engine 121 because the requestor is interested in finding users that are knowledgeable about Apple's mobile operating system. The keyword retrieval engine 291 identifies 606, from an index, one or more keywords that match a term in the search query. In one embodiment, the keyword retrieval engine 291 identifies keywords by searching for exact matches in the index to a term in the search query. In another embodiment, the keyword retrieval engine 291 identifies keywords by searching for keywords similar to the term in the search query.

The profile retrieval engine 293 identifies 608 media corresponding to the one or more keywords and user profiles for users associated with the media. For example, the profile retrieval engine 293 identifies authors or presenters of media, people that participated in a presentation (e.g. asked detailed questions), etc. In one embodiment, the profile retrieval engine 293 identifies the media associated with the keywords and user profiles for authors of the media based on data in the index.

The scoring engine 295 determines 610 a score for each author based on the media. The scoring engine 295 ranks 612 the authors based on the score. In one embodiment, the scoring engine 295 identifies a number of times a keyword appears in the media. For example, the scoring engine 295 determines the number of times the keyword appears in an image of one or more slides. The scoring engine 295 transmits one or more of the user profile and the media to the workflow engine 201, which transmits 614 one or more of the user profile and the media to the requestor.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, with one or more processors, a request from a first device to transmit media from the first device for presentation on a second device;
routing, with the one or more processors, the media from the first device to the second device;
determining, with the one or more processors, that a presenter is different from an author of the media;
in response to routing the media to the second device, logging a device usage entry that includes a unique identifier for the presenter, a unique identifier for the author of the media, a unique identifier for the second device, and a unique identifier referring to the media;
determining an event;
identifying audience members at the event;
determining which audience members participated in the event;
determining, with the one or more processors, one or more keywords relating to content in the media, wherein the one or more keywords relating to the content in the media includes content provided by the audience members that participated in the event;
determining a first score for the presenter based on a number of times that the presenter has given a presentation including the one or more keywords;
determining a second score for the author based on a number of times the one or more keywords appear in the media;
generating an index that includes the one or more keywords and the unique identifier referring to the media; and
updating, with the one or more processors, a first user profile associated with the unique identifier for the presenter to include a first indication of a presenter expert level based on the one or more keywords, the first score, and a first score threshold, and updating a second user profile associated with the unique identifier for the author to include a second indication of an author expert level based on the one or more keywords, the second score, and a second score threshold.

2. The method of claim 1, further comprising:
receiving a search query from a requestor;
identifying, from the index, the one or more keywords that match a term in the search query;
identifying the media corresponding to the one or more keywords;
identifying the first user profile for the presenter associated with the media; and
transmitting one or more of the first user profile and the media to the requestor.

3. The method of claim 1, wherein determining the one or more keywords relating to the content in the media further comprises:
determining parts of the media;
determining the one or more keywords from the parts; and
determining weights for the one or more keywords based on the parts.

4. The method of claim 3, wherein a title receives a higher weight than a keyword in text.

5. The method of claim 1, further comprising ranking the presenter based on the first score.

6. The method of claim 1, wherein generating the index that includes the one or more keywords further comprises:
excluding extraneous words;
identifying a number of times each keyword appears in the media; and
selecting a top number of keywords for the index.

7. A system comprising:
one or more processors;
an enterprise service bus executable by the one or more processors, the enterprise service bus configured to receive a request from a first device to transmit media from the first device for presentation on a second device and route the media from the first device to the second device; and
application services executable by the one or more processors, the application services configured to:
determine that a presenter is different from an author of the media,
receive the request from the enterprise service bus and log a device usage entry that includes a unique identifier for the presenter, a unique identifier for the author of the media, a unique identifier for the second device, and a unique identifier referring to the media;
determine an event;
identify audience members at the event;
determine which audience members participated in the event;
determine one or more keywords relating to content in the media, wherein the one or more keywords relating to the content in the media includes content provided by the audience members that participated in the event;
determine a first score for the presenter based on a number of times that the presenter has given a presentation including the one or more keywords;
determine a second score for the author based on a number of times the one or more keywords appear in the media,
generate an index that includes the one or more keywords and the unique identifier referring to the media; and
update a first user profile associated with the unique identifier for the presenter to include a first indication of a presenter expert level based on the one or more keywords, the first score, and a first score threshold, and updating a second user profile associated with the unique identifier for the author to include a second indication of an author expert level based on the one or more keywords, the second score, and a second score threshold.

8. The system of claim 7, wherein the application services are further configured to receive a search query from the enterprise service bus that originated with a requestor, identify the one or more keywords that match a term in the search query, identify the media corresponding to the one or more keywords, identify the first user profile for the presenter associated with the media, and transmit one or more of the first user profile and the media to the enterprise service bus for transmission to the requestor.

9. The system of claim 7, wherein determining the one or more keywords relating to the content in the media further comprises:
   determining parts of the media;
   determining the one or more keywords from the parts; and
   determining weights for the one or more keywords based on the parts.

10. The system of claim 9, wherein a title receives a higher weight than a keyword in text.

11. The system of claim 7, wherein the application services are further configured to rank the presenter based on the first score.

12. The system of claim 7, wherein generating the index that includes the one or more keywords further comprises:
   excluding extraneous words;
   identifying a number of times each keyword appears in the media; and
   selecting a top number of keywords for the index.

13. A computer program product comprising a non-transitory computer usable medium including a computer readable program, wherein the computer readable program when executed on a computer causes the computer to:
   receive a request from a first device to transmit media from the first device for presentation on a second device;
   route the media from the first device to the second device;
   determine that a presenter is different from an author of the media;
   log a device usage entry that includes a unique identifier for the presenter, a unique identifier for the author of the media, a unique identifier for the second device, and a unique identifier referring to the media;
   determine an event;
   identify audience members at the event;
   determine which audience members participated in the event;
   determine one or more keywords relating to content in the media, wherein the one or more keywords relating to the content in the media includes content provided by the audience members that participated in the event;
   determine a first score for the presenter based on a number of times that the presenter has given a presentation including the one or more keywords;
   determine a second score for the author based on a number of times the one or more keywords appear in the media;
   generate an index that includes the one or more keywords and the unique identifier referring to the media; and
   update a first user profile associated with the unique identifier for the presenter to include a first indication of a presenter expert level based on the one or more keywords, the first score, and a first score threshold, and updating a second user profile associated with the unique identifier for the author to include a second indication of an author expert level based on the one or more keywords, the second score, and a second score threshold.

14. The computer program product of claim 13, further causing the computer to:
   receive a search query from a requestor;
   identify, from the index, the one or more keywords that match a term in the search query;
   identify the media corresponding to the one or more keywords;
   identify the first user profile for the presenter associated with the media; and
   transmit one or more of the first user profile and the media to the requestor.

15. The computer program product of claim 13, wherein determining the one or more keywords relating to the content in the media further comprises:
   determining parts of the media;
   determining the one or more keywords from the parts; and
   determining weights for the one or more keywords based on the parts.

16. The computer program product of claim 15, wherein a title receives a higher weight than a keyword in text.

17. The computer program product of claim 13, further causing the computer to rank the presenter based on the first score.

* * * * *